United States Patent
Cordery et al.

(10) Patent No.: US 6,847,951 B1
(45) Date of Patent: Jan. 25, 2005

(54) METHOD FOR CERTIFYING PUBLIC KEYS USED TO SIGN POSTAL INDICIA AND INDICIA SO SIGNED

(75) Inventors: Robert A. Cordery, Danbury, CT (US); Leon A Pintsov, West Hartford, CT (US); Scott A Vanstone, Waterloo Ontario (CA)

(73) Assignee: Pitney Bowes Inc., Stamford, CT (US)

(*) Notice: Subject to any disclaimer, the term of this patent is extended or adjusted under 35 U.S.C. 154(b) by 0 days.

(21) Appl. No.: 09/280,528

(22) Filed: Mar. 30, 1999

(51) Int. Cl.[7] ............................................. G06F 17/60
(52) U.S. Cl. ......................................................... 705/60
(58) Field of Search ............................. 705/60, 62, 71, 705/410, 408; 713/176, 158, 155; 380/277, 278, 279, 51, 55; 101/91

(56) References Cited

U.S. PATENT DOCUMENTS

| | | | |
|---|---|---|---|
| 4,796,193 A | | 1/1989 | Pitchenik |
| 4,853,961 A | * | 8/1989 | Pastor ........................ 73/176 |
| 5,214,702 A | | 5/1993 | Fischer |
| 5,420,927 A | | 5/1995 | Micali |
| 5,442,707 A | | 8/1995 | Miyaji et al. |
| 5,497,423 A | | 3/1996 | Miyaji |
| 5,588,061 A | | 12/1996 | Ganesan et al. |
| 5,604,804 A | | 2/1997 | Micali |
| 5,610,982 A | | 3/1997 | Micali |
| 5,661,803 A | * | 8/1997 | Cordery et al. ............... 705/60 |
| 5,680,456 A | * | 10/1997 | Baker et al. .................. 705/71 |
| 5,737,419 A | | 4/1998 | Ganesan ....................... 380/30 |
| 5,742,682 A | * | 4/1998 | Baker et al. ................. 380/277 |
| 5,805,701 A | * | 9/1998 | Ryan, Jr. ...................... 705/60 |
| 5,867,578 A | | 2/1999 | Brickell et al. ............... 380/30 |
| 5,878,136 A | * | 3/1999 | Kim et al. ..................... 705/60 |
| 5,982,896 A | * | 11/1999 | Cordery et al. ............... 705/62 |
| 6,041,704 A | * | 3/2000 | Pauschinger ................. 101/91 |
| 6,175,827 B1 | * | 1/2001 | Cordery et al. ............. 705/410 |
| 6,212,281 B1 | | 4/2001 | Vanstone |
| 6,295,359 B1 | * | 9/2001 | Cordery et al. ............... 380/44 |
| 6,336,188 B2 | | 1/2002 | Blake-Wilson et al. |
| 6,341,349 B1 | | 1/2002 | Takaragi et al. |
| 6,411,716 B1 | | 5/2002 | Brickell |
| 6,418,422 B1 | | 7/2002 | Guenther et al. |
| 6,424,712 B2 | | 7/2002 | Vanstone et al. |

FOREIGN PATENT DOCUMENTS

| | | |
|---|---|---|
| EP | 0 762 692 A2 | * 12/1997 |
| EP | 0 892 520 A2 | 1/1999 |

OTHER PUBLICATIONS

Kerstetter, Jim; Stamping Out Fraud; Jul. 13, 1998; PC Week v15, n28, p14(1), dialog copy.*

(List continued on next page.)

*Primary Examiner*—Thomas A. Dixon
(74) *Attorney, Agent, or Firm*—Steven J. Shapiro; Angelo N. Chaclas (57) ABSTRACT

A method for certifying the public key of a digital postage meter using a public key encryption system by a certifying authority. A certifying station and a user station, or a digital postage meter, exchange information and the user station and downloads, or the meter derives, a public key from the exchanged information. The certifying station also publishes related information and its public key. A third party can derive the public key corresponding to the meter's private key by operating on the published information with the certifying station public key.

20 Claims, 8 Drawing Sheets

OTHER PUBLICATIONS

EIC NPL search on postage meter and public key encryption technology enclosed.

Ravi Gansan, Yaksha: Augmenting Kerberos with public Key Cryptography, Network and Distributed System Security, 1995, Symposium, pp. 132–143.

Menezes et al., Handbook of Applied Cryptography, CRC Press, LLC, 1997, pp. 5220–522 and 562–566.

Menezes A. et al.: "The Implementation of Elliptic Curve Cryptosystems"—Advances in Cryptology—Auscrypt. Sydney, Jan. 8–11, 1990, proceedings of the International Conference on Cryptology—Auscrypt, Berlin, Springer, DE, vol. CONF. 1, Jan. 8, 1990 (1990–01–08), pp. 2–13, XP000145197 ISBN: 3–540–53000–2.

Tygar J. D. et al.: "Cryptographic Postage Indicia"—Lecture Notes in Computer Science, Springer Verlag, New York, NY, US, vol. 1179, Dec. 1996 (1996–12), pp. 378–391, XP000878831 –ISSN: 0302–9743.

* cited by examiner

METHOD FOR CERTIFYING PUBLIC KEYS USED TO SIGN POSTAL INDICIA AND INDICIA SO SIGNED

RELATED APPLICATIONS

The present application is related to, and discloses subject matter common to commonly assigned, co-pending applications Ser. Nos. 09/280,527 and 09/280,529, filed on even date herewith.

BACKGROUND OF THE INVENTION

The subject invention relates to encryption of information using public key encryption technology. (By "public key" encryption herein is meant encryption technology which uses pairs of keys: a public key, which is published or made publicly known; and a corresponding private key, kept secret by a user.) More particularly it relates to the use of private keys to certify postal indicia and the like and the certification of corresponding public keys.

Using public key encryption anyone can encrypt a message with a public key and have assurance that only a user (i.e. a party having the corresponding private key) can decrypt it, and a user can "sign" a message using the corresponding private key and anyone can use the public key to ascertain if the message originated with the user. (A message is "signed" by deriving encrypted information derived in a known manner from the message.)

Because public keys can be distributed so widely, it will in general be the case that persons communicating with users of public key systems will not be in direct contact with the users and will not be able to directly determine the identity and/or characteristics of the putative users of a public key system. For example, proof of payment systems, in particular postage meters, which generate indicia encrypted using public key systems as proof of payment have recently been developed by the assignee of the present application and others; and, given the hundreds of thousands of postage meters in service, it is clear that the postal services will face a severe problem in assuring that indicia purportedly generated by a meter corresponding to a particular public key is in fact generated by an authorized postage meter.

To overcome the difficulties inherent in authenticating public keys numerous schemes for issuing certificates for public keys have been proposed. In such schemes, a trusted third party (hereinafter sometimes a "certifying authority") provides parties who wish to communicate with a user with a certificate containing the user's public key, the certificate serving to evidence the third party's assurances as to the identity or characteristics of the user. In the simplest case such certificates are no more than entries in a directory delivered through a secure channel. More generally the certifying authority will use an encryption technology to deliver the certificate.

In U.S. Pat. No. 4,853,961; for: "Reliable Document Authentication System"; to: Pastor, a public key for a postage meter is encrypted with a third party's private key and included in the meter indicia. The postal service uses the third party's public key to recover the meter public key and decrypt the encrypted message which serves to validate the indicia.

In U.S. Pat. No. 5,661,803; for: "Method of Token Verification in a Key Management System"; to: Cordery et al., a method of token verification in a key management system is disclosed.

In U.S. Pat. No. 5,680,456; for: "Method of Manufacturing Generic Meters in a Key Management System"; to: Baker et al., a method for manufacturing transaction evidencing devices such as postage meters includes the steps of generating a master key in a logical security domain of a key management system and installing the master key in a postage meter.

In U.S. Pat. No. 5,742,682; for: "Method of Manufacturing Secure Boxes in a Key Management System"; to: Baker et al., a method of manufacturing a secure box in a key management system is taught.

In U.S. Pat. No. 5,805,701; for: "Enhanced Encryption Control System for a Mail Processing System Having Data Center Verification"; to: Ryan, Jr., a key control system comprising generation of a first set of master keys and assigning the keys to a corresponding plurality of postage meters is taught.

In U.S. Pat. No. 5,878,136; to: Kim et al.; filed Oct. 8, 1993, issued: Mar. 2, 1999, a key control system comprising generation of a first set of master keys and assigning the keys to a corresponding plurality of postage meters is taught. Keys may be changed by entry of a second key via encryption with a first key.

In U.S. Pat. No. 5,661,803; to: Cordery et al.; issued: Aug. 26, 1997, a method for controlling keys used in the verification of encoded information generated by a transaction evidencing device and printed on a document is taught.

The ITU X509.3 standard teaches a standard in which a first user's certificates includes the user's public key, identification and authorization information, and a signature of the certificate authority. A second user verifies a signature of a message generated by the first user by verifying that the authorization information is satisfactory, that the certificate authority's signature on the certificate verifies, extracting the first user's public key, and verifying the signature.

While the above methods are successful in achieving their intended purpose they are disadvantageous in that they are computationally complex, may produce certificates which are large and inflexible, and may require special hardware.

The following references contain information useful to a general understanding of elliptic curve encryption and certification of public keys.

Secure Hash Standard—FIPS PUB 180-1," Apr. 17, 1995.

Digital Signature Standard—FIPS PUB 186," May 19, 1994 and Change 1, Dec. 30, 1996.

ANSI X9.62, Elliptic Curve Digital Signature Algorithm Standard (ECDSA), Working Draft, Jan. 15, 1997.

ISO/IEC 9594-8 (1995). Information Technology—Open Systems Interconnection—The Directory: Authentication Framework."

PKCS #10: Certification Request Syntax Standard, An RSA Laboratories Technical Note," Version 1.0, December 1993.

Another method of key certification based upon elliptic curve public key encryption technology has been developed by the Certicom Corporation. (The use of elliptic curve encryption technology is known and a more detailed description of its use, beyond what is given below in the context of certification of public keys, is not required for an understanding of the subject invention.)

Elliptic curve encryption is an example of a cryptographic algorithm based on application of an binary operator to points in a finite group. In elliptic curve encryption a finite group of points [P] of order n is defined on an elliptic curve.

Figure 1:
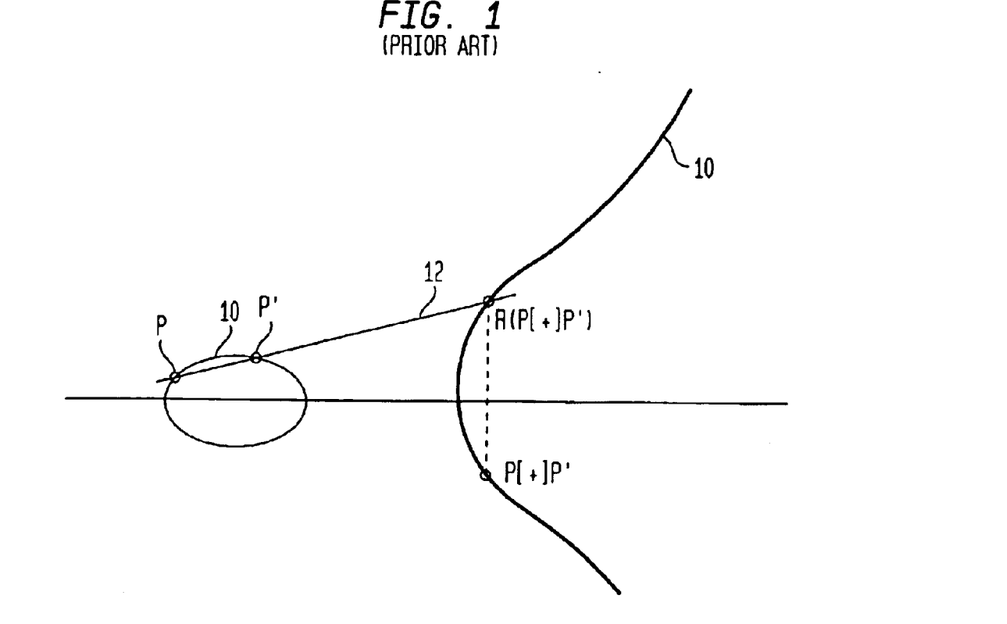
FIG. 1 is a graph illustrating the prior art operation of point addition of points P and P'.

A binary additive operator [+] (hereinafter sometimes "point addition") is defined on the group [P] such that P[+]P' is a point in [P]. A more detailed, graphical description of point addition is shown in FIG. 1. As is known to those skilled in the cryptographic art, disjoint curve 10 has the general form $y^2=x^3+ax+b$ defined over the finite Galois field $GF(p^m)$ where p is a prime number other than 2 and m is an integer. Over the Galois field $GF(2^m)$ the curve has the form $y^2+xy=x^3+ax+b$. It can be shown that groups of discrete points [P] of order n can be defined on curve 10, where n is preferably a number on the order of at least 50 decimal digits in order to provide sufficient security for encrypted information.

As is seen in FIG. 1 curve 10 is symmetric about the x axis so that for any point (x,y) on curve 10 its reflection around the x axis R(x,y)=(x,−y) is also on curve 10.

For two points P,P' in [P] it can be show that there exists a unique point R(P[+]P') which is a third point common to straight line 12 defined by P and P' and curve 10. P[+]P' is defined as R(R(P[+]P').

Figure 2:
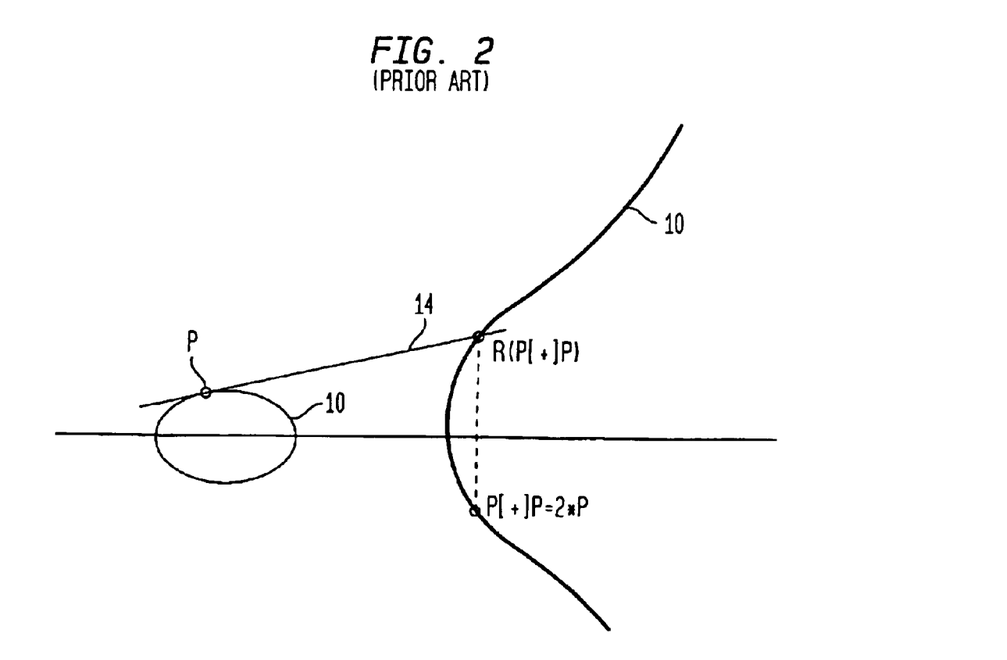
FIG. 2 is a graph illustrating the prior art operation of point addition of two copies of point P.

FIG. 2 shows the special case for computation of P[+]P. Straight line 14 is defined as tangent to the closed portion of curve 10 and intersecting point P, and R(P[+]P) is defined as the second point common to line 14 and curve 10.

Figure 3:
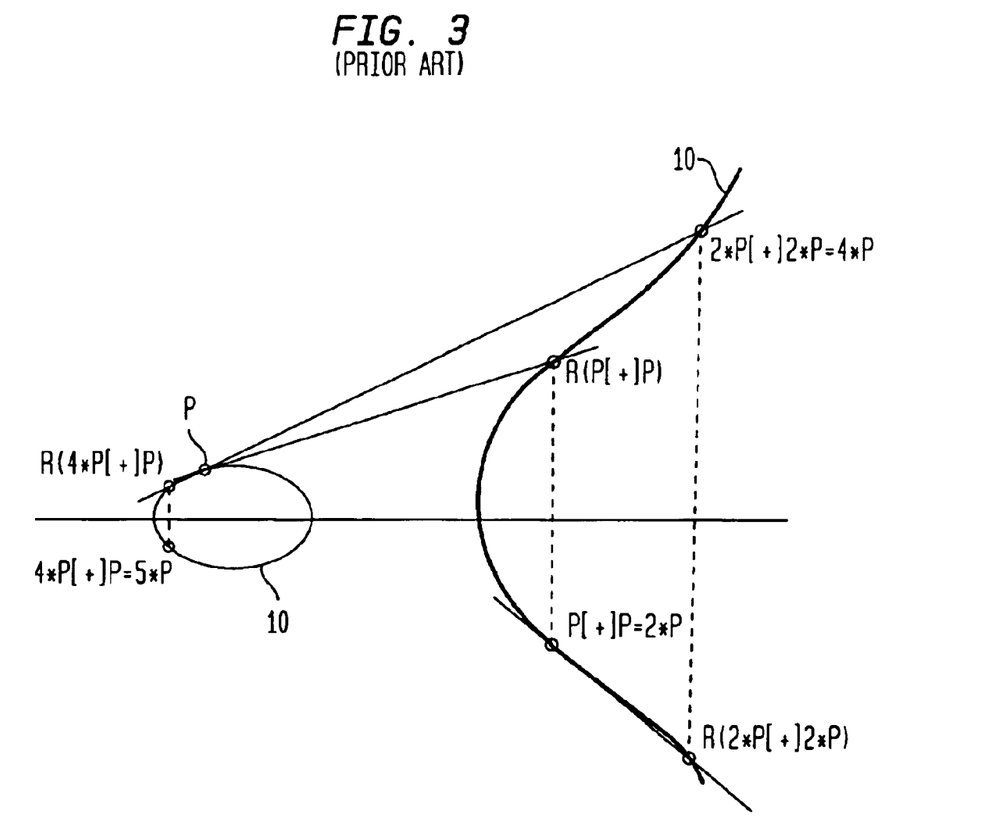
FIG. 3 is a graph illustrating the prior art operation of point multiplication of point P.

A second operation K*P (herein after sometimes "point multiplication") is defined as the application of [+] to K copies of a point P. FIG. 3 geometrically illustrates computation of 5*P by successive computation of the points P[+]P=2*P, 2*P[+]2*P=4*P, 4*P[+]P=5*P. Point multiplication is the basic operation underlying elliptic curve encryption and has the property that computation of K from knowledge of the group [P], a particular point P, and K*P is hard.

By "hard" as used herein in regard to computation is meant a computation wherein the time required increases faster than the order of the operands log n, preferably exponentially or faster with the order of the operands (log n)|. This means that where K is of order n, the order of [P], and n is chosen large enough the cost, in time or money, of computing K from knowledge of the definition of [P], P, and K*P can be made arbitrarily large while the cost of other computations relating to encryption or decryption remains relatively low and practicable. Of course those skilled in the encryption art will recognize that, even though encryption and decryption can in principle be carried out by manual computation, the possibly of an attack on an encryption scheme using modem computer technology requires that, in practice, the order n be so great that even the relatively easy computations must be carried out by automated encryption stations; e.g. special purpose, or specially programmed general purpose, digital processing systems.

Point multiplication has been described in terms of the group represented by point addition on a discrete elliptic curve. In other embodiments the subject invention can be implemented using any group representation where determining K is hard given the point P and the point formed by combining K copies of point P by repeated application of the group additive point operation.

In elliptic curve encryption a user U has a private key $Key_U$ and a corresponding public key $Key_U*P$; where P is a published or publicly known point in [P]. To generate a certified public key in accordance with the above mentioned Certicom encryption scheme user U (i.e. a station operated by user U) generates and keeps secret a random number $r_U$; and computes and sends to a certifying authority CA the point $r_U*P$. Certifying authority CA has a private $Key_{CA}$ and a public key $Key_{CA}*P$. Upon receipt of $r_U*P$ the CA generates a random number $r_{CA}$ and computes and publishes a certificate including a point, $r_U*P[+] r_{CA}*P$, wherein $r_{CA}$ is a random number generated by the CA (i.e. by the CA station). Authority CA, which is presumed to have the capability to directly determine the identity or characteristics of user U, also generates information $ID_U$ and about U includes $ID_U$ in the certificate. Certifying Authority CA then returns an integer derived from the CA's private key and the certificate to the user station which uses that integer to compute key $KEY_U$ in such a manner that a party communicating with user U can compute $KEY_U*P$ from the certificate and the certifying authority's public key $Key_{CA}$; providing evidence that the certifying authority has linked user U, $KEY_U$, and $ID_U$.

The above described certification scheme is believed to be advantageous in that it is computationally simpler, produces smaller certificates, and does not require special secure hardware. However it does not address the special situation of certification of public keys used to verify value evidencing indicia such as digital postal indicia. For example, a Postal Service which wishes to verify encrypted metered mail may need assurance that the putative public key of a meter has been certified by the meter manufacturer or one or more agencies of the Postal Service. It is also desirable that digital signatures (hereinafter sometimes Cryptographic Integrity Validation Code or CIVC) of postal indicia and the like satisfy the following requirements:

1. The CIVC must possess cryptanalytic strength above a predetermined threshold, typically $2^{80}$ operations; that is the best known algorithms the find a secret key from publicly available plain texts and cyphertexts requires at least $2^{80}$ operations.

2. The CIVC should be of minimal size due to limitations of space available for postal indicia and the like, and the CIVC size needed to maintain required cryotanalytic strength should increase slowly with improvements in cryptanalytic algorithms.

3. Computational requirements to generate and verify CIVC's should be compatible with the fastest mail generation or verification equipment.

4. The indicia, including CIVC's, should contain all the information needed for verification.

5. The indicia should contain information allowing the verifier to perform audit functions to reduce risk of misuse of carrier funds. In particular certification of a postage meter key should also implicitly evidence meter operating parameters such as expiration date or maximum postage value.

6. Costs of the system, including infrastructure such as key management systems, should be minimal.

Methods and systems based on known public key cryptographic schemes such as RSA, DSA, or ECDSA have been suggested but are not believed to fully satisfy the requirements of a digital postage metering system. Accordingly it is an object of the subject invention to provide a method for controlling, and distributing information among, digital postage meters, and the like, and a certifying authority so that such meters can generate indicia, and public keys for verifying such indicia can be certified in a functionally satisfactory and cost effective system.

BRIEF SUMMARY OF THE INVENTION

The above object is achieved and the disadvantages of the prior art are overcome in accordance with subject invention by method for controlling a digital postage meter and a certifying station operated by a certifying authority CA for publishing information, so that a public key $\text{Key}_{DM}*P$ of the digital postage meter can be determined by a party seeking to verify indicia printed by the digital postage meter from the published information with assurance that the public key $\text{Key}_{DM}*P$ has been certified by the certifying authority CA, where the method includes; defining and publishing a finite group [P] with a binary operation [+] and publishing a particular point P in the group; defining and publishing a binary operation $K*P$, where K is an integer and P is a point in the group, such that $K*P$ is a point in the group computed by applying the operation [+] to K copies of the point P, and computation of K from knowledge of the definition of the group [P], the point P, and $K*P$ is hard. The certifying station is controlled to publish a certificate $\text{OMC}_{DM}$ for the digital postage meter, wherein;

$$\text{OMC}_{DM}=(r_{DM}+r_{CA})*P; \text{ and wherein}$$

$r_{DM}$ is a random integer generated by the digital postage meter and $r_{CA}$ is a random integer generated by the certifying station;

and to publish a message M; generate an integer $I_{DM}$; and send the integer to the digital postage meter, wherein;

$$I_{DM}=r_{CA}+H(M)\text{Key}_{CA}; \text{ and wherein}$$

H(M) is an integer derived from the message M in accordance with a publicly known algorithm H and $\text{Key}_{CA}$ is a private key of the certifying authority CA. A public key $\text{Key}_{CA}*P$ for the certifying authority CA is published; and the digital postage meter to computes a private key $\text{Key}_{DM}$:

$$\text{Key}_{DM}=r_{DM}+I_{DM}=r_{DM}+r_{CA}+H(M)\text{Key}_{CA}.$$

The digital postage meter then prints an indicium and digitally sign the indicium with the key $\text{Key}_{DM}$. A verifying party can then compute meter public key $\text{Key}_{DM}*P$ as $$\text{Key}_{DM}\cdot P=\text{OMC}_{DM}+H(M)\text{Key}_{CA}*P=(r_{DM}+r_{CA})*P+H(M)\text{Key}_{CA}*P$$

from knowledge of H, M, [P], the public key $\text{Key}_{CA}*P$, and $\text{CERT}_{DM}$.

In accordance with one aspect of the subject invention the publicly known manner for deriving an integer from the published information includes applying a hashing function to the message M.

In accordance with another aspect of the subject invention the message M includes information IAV identifying the digital postage meter and operating parameters applicable to the digital postage meter.

In accordance with another aspect of the subject invention the group [P] is defined on an elliptic curve.

In accordance with another aspect of the subject invention the message M includes information tying the postage meter public key $\text{Key}_{DM}*P$ to the information IAV.

An article in accordance with the subject invention has an indicium imprinted thereon as evidence of attributes of the article. The indicium including a signature generated with a private key of a first party; a certificate; information specifying attributes of the article. The private key of the first party is generated as a function of the certificate, the information, and a private key of a certifying authority, the function being chosen so that a party wishing to verify the indicium can determine a public key corresponding to the private key of the first party by operating on the certificate and the information with a corresponding public key of the certifying authority.

A digital postage meter in accordance with the subject invention is controlled to print indicia signed with a private key $\text{Key}_{DM}$ based upon a published a finite group [P] with a binary operation [+] and a published particular point P in the group and a published a binary operation $K*P$, where K is an integer and P is a point in the group, such that $K*P$ is a point in the group computed by applying the operation [+] to K copies of the point P, and computation of K from knowledge of the definition of the group [P], the point P, and $K*P$ is hard, so that a public key $\text{Key}_{DM}*P$ of the digital postage meter can be determined by a party seeking to verify indicia printed by the digital postage meter from published information with assurance that the public key $\text{Key}_{DM}*P$ has been certified by a certifying authority CA. The meter is controlled to; generate a random number $r_{DM}$ and send a point $r_{DM}*P$ to a certifying station; receive a certificate, $\text{OMC}_{DM}$ from a certifying station operated by the certifying authority CA, wherein;

$$\text{OMC}_{DM}=(r_{DM}+r_{CA})*P; \text{ and wherein}$$

$r_{DM}$ is a random integer generated by the digital postage meter and $r_{CA}$ is a random integer generated by the certifying station; receive an integer $I_{DM}$ from the certifying station, wherein;

$$I_{DM}=r_{CA}+H(M)\text{Key}_{CA}; \text{ and wherein}$$

M is a message published by the certifying station and H(M) is an integer derived from the message M in accordance with a publicly known algorithm H and $\text{Key}_{CA}$ is a private key of the certifying authority CA; compute a private key $\text{Key}_{DM}$, $$\text{Key}_{DM}=r_{DM}+I_{DM}=r_{DM}+r_{CA}+H(M)\text{Key}_{CA};$$

and print an indicium and digitally sign the indicium with the key $\text{Key}_{DM}$.

A certifying station operated by a certifying authority CA in accordance with the subject invention is controlled to publish information relating to a digital postage meter for printing indicia signed with a private key $\text{Key}_{DM}$ based upon a published a finite group [P] with a binary operation [+] and a published particular point P in the group and a published a binary operation $K*P$, where K is an integer and P is a point in the group, such that $K*P$ is a point in the group computed by applying the operation [+] to K copies of the point P, and computation of K from knowledge of the definition of the group [P], the point P, and $K*P$ is hard, so that a public key $\text{Key}_{DM}*P$ of the digital postage meter can be determined by a party seeking to verify indicia printed by the digital postage meter from the published information with assurance that the public key $\text{Key}_{DM}*P$ has been certified by a certifying authority CA. The station is controlled to; receive a point $r_{DM}*P$ from the digital postage meter, where $r_{DM}$ is a random number generated by the digital postage meter; generate and send to the digital postage meter a certificate $\text{OMC}_{DM}$, wherein;

$$\text{OMC}_{DM}=(r_{DM}+r_{CA})*P; \text{ and wherein}$$

$r_{CA}$ is a random integer generated by the certifying station; generate and send to the digital postage meter an integer $I_{DM}$, wherein;

$$I_{DM}=r_{CA}+H(M)\text{Key}_{CA}; \text{ and wherein}$$

M is a message published by the certifying station and H(M) is an integer derived from the message M in accordance with a publicly known algorithm H and $\text{Key}_{CA}$ is a private key of the certifying authority CA.

In accordance with still another aspect of the subject invention a certifying authority certifies a public key of a digital postage meter, the digital postage meter producing indicia signed with a corresponding private key of the digital postage meter, the certifying authority having a published public key and a corresponding private key, by providing the meter with an integer, the integer being a first function of the private key of the authority; the meter computing a digital postage meter private key as a second function of the integer; and the certifying authority publishing related information. The first function, the second function and the published related information are chosen so that a party seeking to verify the indicia can compute the digital postage meter public key by operating on the published related information with the published public key of the authority.

In accordance with still another aspect of the subject invention a certifying authority certifies a public key of a digital postage meter, the digital postage meter producing indicia signed with a corresponding private key of the digital postage meter, the certifying authority having a published public key and a corresponding private key, by the certifying authority providing a user with an integer, the integer being a first function of the private key of the authority; the user computing a digital postage meter private key as a second function of the integer and downloading the postage meter private key to the digital postage meter; and the certifying authority publishing related information. The first function, the second function and the published related information are chosen so that a party seeking to verify the indicia can compute the digital postage meter public key by operating on the published related information with the published public key of the authority.

Other objects, advantages and features of the subject invention will be apparent from consideration of the attached drawings and the detailed description set forth below.

DETAILED DESCRIPTION OF PREFERRED EMBODIMENTS OF THE INVENTION

Figure 4:
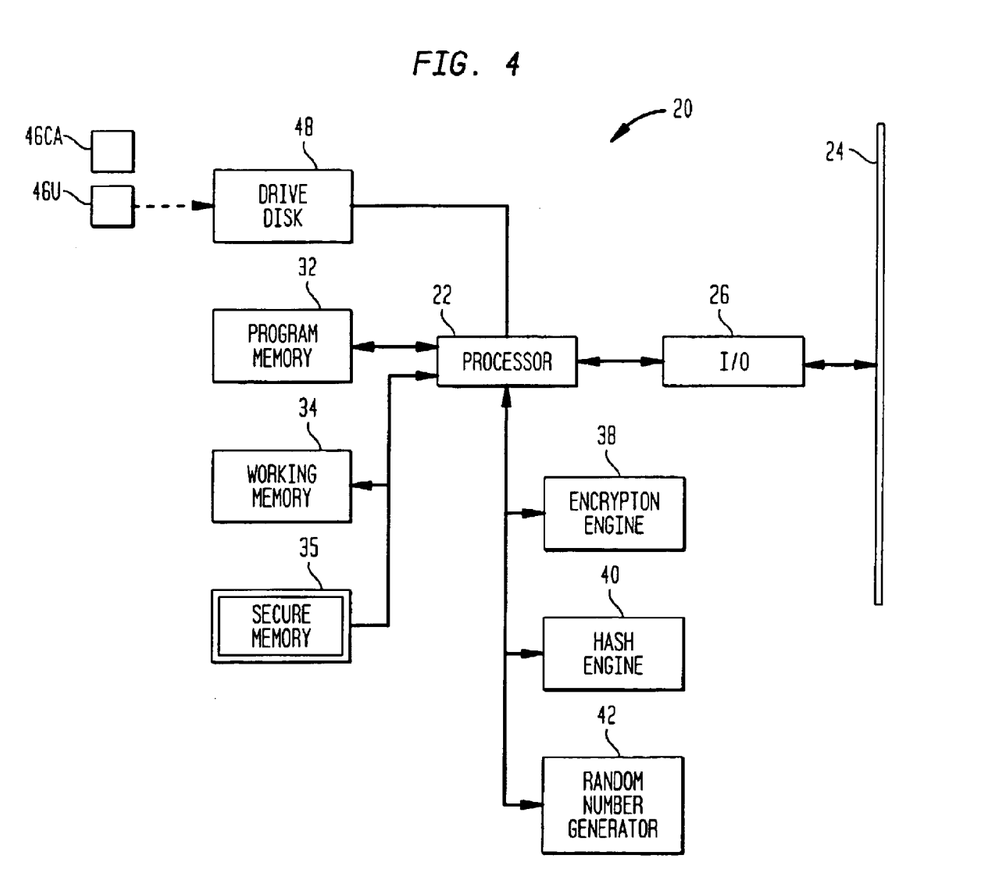
FIG. 4 is a schematic block diagram of a general encryption station which can be programmed to serve in digital postage meters, user stations or certifying stations.

FIG. 4 shows a general encryption station 20 which can be adapted to perform the functions required by a user or a certifying authority. Station 20 can also be incorporated into a digital postage meter in embodiments of the subject invention where a communications link is provided between a certifying authority and a postage meter for generation of public key pairs and corresponding certificates.

Digital postage meters are well known devices for printing mail pieces with indicia evidencing payment of postage and accounting for postage expended and a description of their operation in carrying out these functions is not necessary for an understanding of the subject invention. Also, it will be apparent to those skilled in the art that the various functional units shown in FIG. 4 need not be incorporated in corresponding hardware subsystems but can be provided, wholly or partially, by appropriate software routines.

Station 20 includes processor 22 connected to data link 24 through I/O device 26. Data link 24 may be of any convenient kind, including but not limited to computer communication networks, telephone networks and dedicated lines, or can simply be the exchange of portable data storage media such as magnetic disks, with I/O device 26 being designed in a conventional manner to interface to link 24.

Processor 22 also communicates with program memory 32 to access program code to control station 20 to carry out functions of a user or digital postage meter in generating a public key pair, or of certifying authority in generating a corresponding certificate, and working memory 34 for temporary storage of data.

To increase security, station 20 also includes secure memory 35 for storing certain critical parameters, as will be described further below. Preferably memory 35 is secured against unauthorized access by conventional means known to those skilled in the art, which can include physical security such as be shielding and software based techniques such as passwords and encryption.

Processor 22 also communicates with, and controls as necessary: encryption engine 38 for carrying out point additions and point multiplications; hash engine 40 for performing a publicly known hash function, preferably the SHA-1 hash function promulgated by the National Security Agency; and random number generator 42 for generating random numbers. While the above described engines have been shown as dedicated devices for clarity of illustration, in other embodiments the encryption, hashing, and random number generation functions can be carried out by software routines stored in program memory 32.

Station 20 is preferably adapted to carry out the functions of a user or a certifying authority by reading signals representative of an appropriate control program code recorded on portable media such as magnetic disks 46U or 46CA into program memory through disk drive 48 (For security reasons postage meters are preferably not designed to be programmable. Details of the operations of certifying authorities and users, or digital postage meters, in carrying out the method of the subject invention are described more fully below and development of control programs to control stations to function in such roles would be well within the ability of a person skilled in the cryptographic art.).

Figure 5:
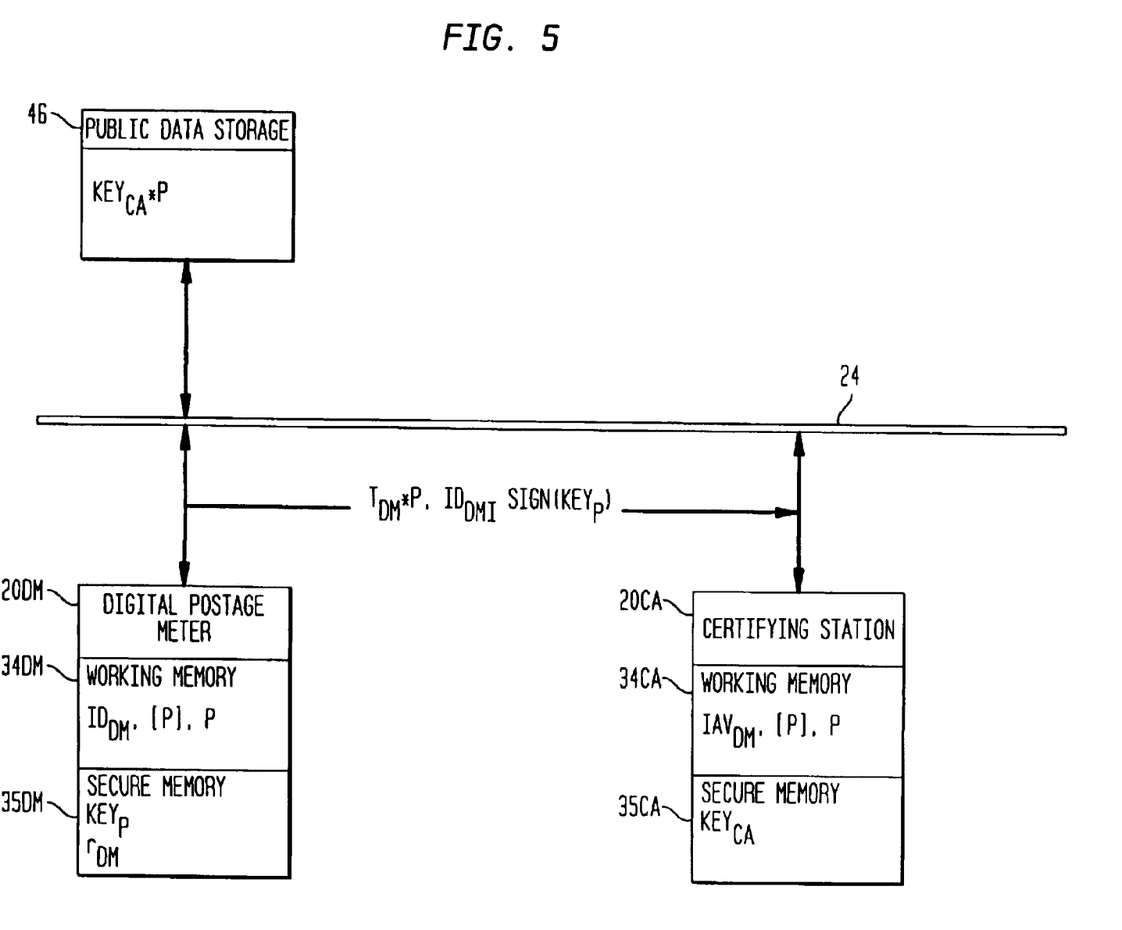
FIGS. 5 and 6 show communication of a digital postage meter and a certifying station over a data link to generate a public key pair and certificate in accordance with the method of the subject invention.
Figure 6:
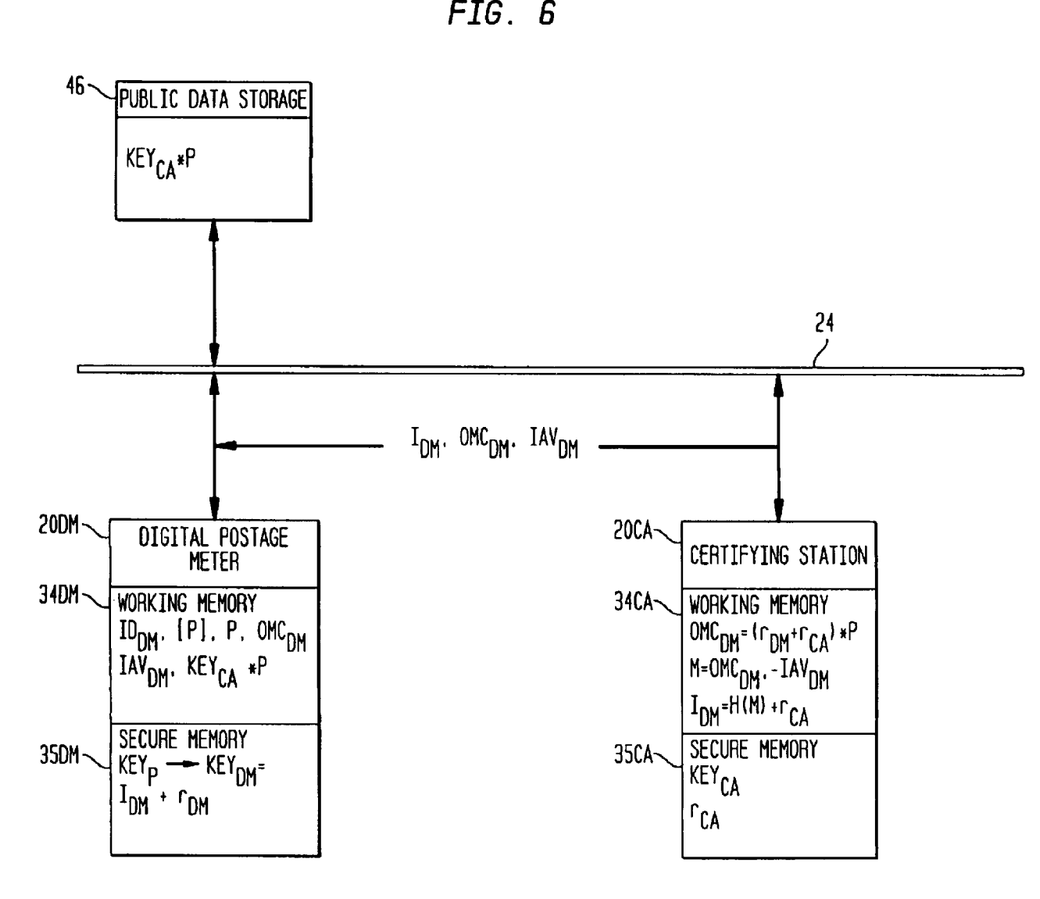

FIGS. 5 and 6 show a digital postage meter and a certifying station having substantially the architecture shown in FIG. 4 which communicate over data link 24 to carry out the method of the subject invention in an embodiment where digital postage meters communicate directly with a certifying authority. Public data store 46 is also connected to link 24 to store data accessible to any party communicating over link 24.

Initially meter 20DM stores identifying information $ID_{DM}$ (e.g. a meter identification number), a description of a group [P] (i.e. information needed to carry out additive operation

[+]) and a particular, publicly known point P in its working memory 34DM, and stores a previous private Key$_p$ in secure memory 35DM. A certifying station 20CA operated by a certifying authority (which can be a postal authority or an agent such as an equipment supplier designated by a postal authority), stores [P], P, and information IAV$_{DM}$ which identifies or characterizes meter 20 DM, as will be described further below, in its working memory 34CA; and private key Key$_{CA}$ in secure memory 35CA.; and public data store 46 stores public key Key$_{CA}$*P.

Meter 20DM initiates the certification process by generating and storing a random number r$_{DM}$ in secure memory 35DM, computing the point r$_{DM}$*P, and sending point r$_{DM}$*P to station 20CA together with its identifying information ID$_{DM}$. The information is signed using the previous private key of meter 20DM to provide assurance to station 20CA as to the source of the information. An initial private key can be installed in meter 20DM by the equipment supplier. Other methods for assuring the source of communications, such as physical control of the device, secure channels or call back protocols can also be used to provide assurance of the source of the information.

In FIG. 6 station 20CA identifies the Identity and Attributes Value, IAV$_{DM}$, for meter 20DM and then generates and stores a random number r$_{CA}$ in secure memory 35CA and computes the point:

$$OMC_{DM}=r_{DM}*P[+]r_{CA}*P=(r_{DM}+r_{CA})*P$$

In the case where a certifying station cannot certify meter 20DM the station can enter an error routine to abort the certification process. Details of such an error routine form no part of the subject invention. In other embodiments of the invention, successive certifying stations can alter or amend information ID$_U$ to indicate user U's status.

Station 20CAF then generates message M:

$$M=OMC_{DM}, IAV_{DM}$$

and computes a hash H(M) of message M where H is a publicly known hashing function and is preferably the known SHA-1 function and then generates an integer I$_{DM}$:

$$I_{DM}=r_{CA}+H(M)Key_{CA}$$

and sends integer I$_{DM}$ to meter 20DM together with OMC$_{DM}$ and IAV$_{DM}$. (In computing integer I$_{DM}$ the expression of point OMC$_{DM}$ is handled as an integer.)

Meter 20DM then computes private key Key$_U$:

$$Key_{DM}=r_{DM}+I_{DM}=r_{DM}+r_{CA}+H(M)Key_{CA}.$$

Meter 20DM then uses Key$_{DM}$ to sign indicia it generates, as will be described further below. A postal authority or other party seeking to verify meter 20DM's public key can compute Key$_{DM}$*P as:

$$Key_{DM}*P=OMC_{DM}[+]H(M)Key_{CA}*P=r_{DM}+r_{CA}*P+H(M)Key_{CA}*P$$

from knowledge of H, M, said public key Key$_{CA}$*P, and OMC$_{DM}$. Since the computation of public key Key$_{DM}$*P requires public key Key$_{CA}$*P the verifying party has assurance that Key$_{DM}$*P has been certified by certifying authority CA.

Figure 7:
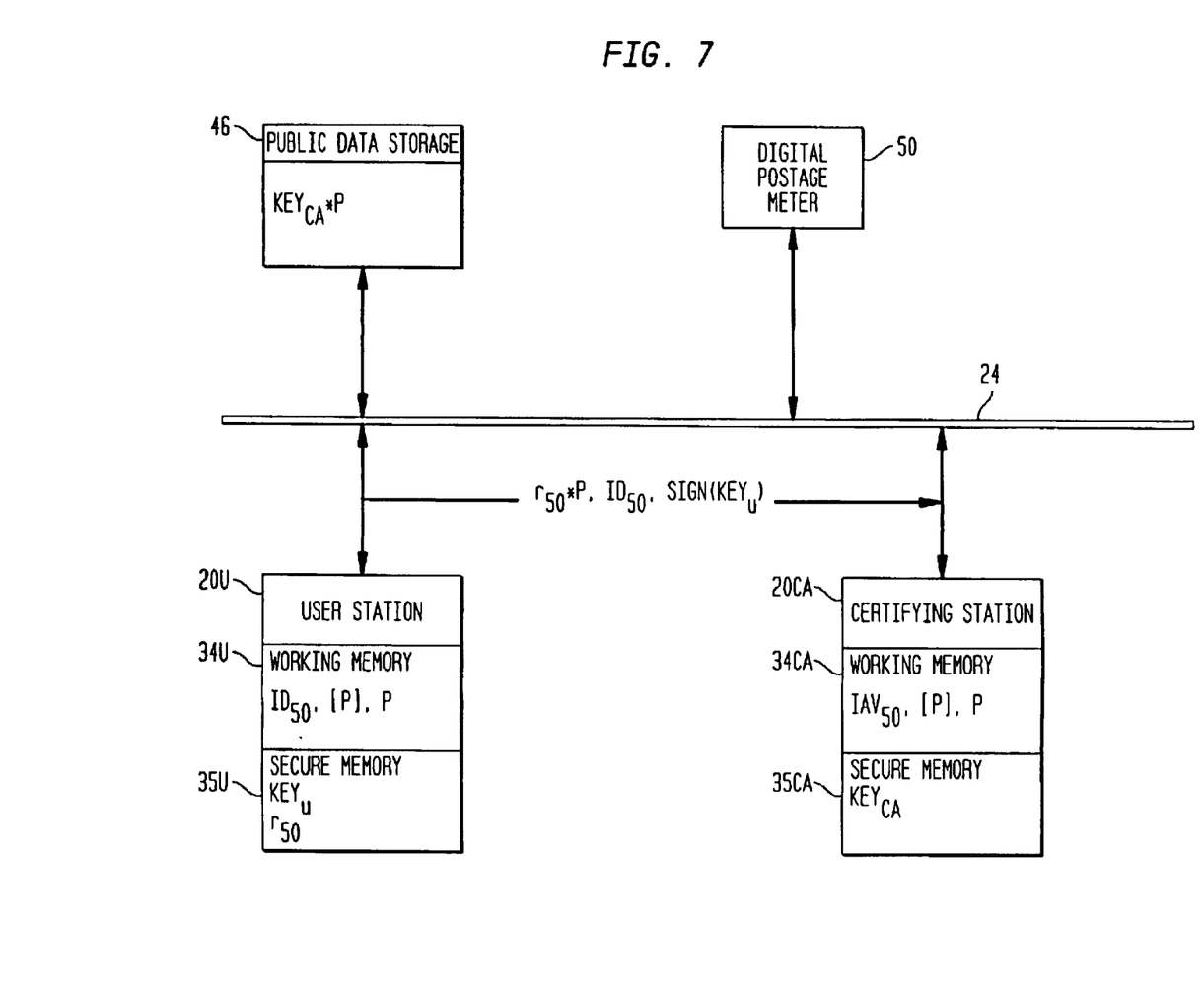
FIGS. 7 and 8 show communication of a user station and a certifying station over a data link to generate a public key pair for downloading to a digital postage meter, and a certificate in accordance with the method of the subject invention.
Figure 8:
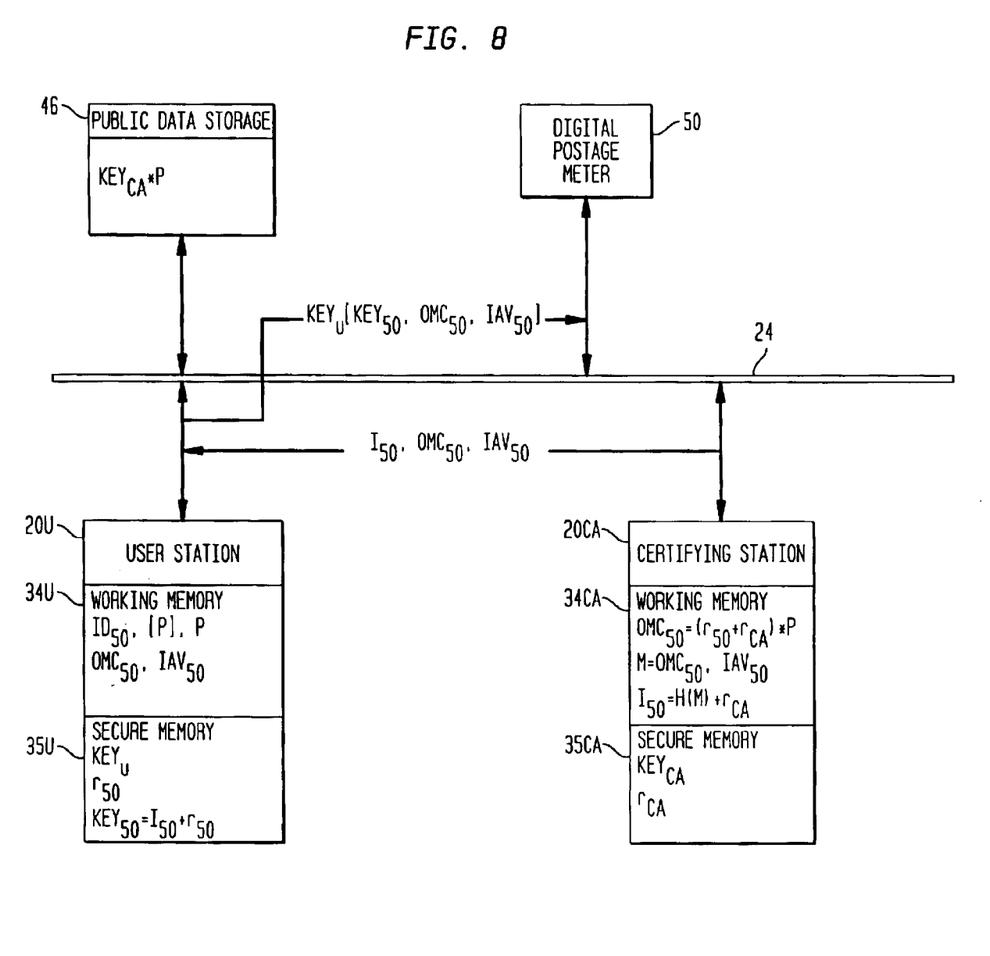

FIGS. 7 and 8 show a user and a certifying station having substantially the architecture shown in FIG. 4 which communicate over data link 24 to carry out the method of the subject invention in an embodiment where a user, which can be a digital postage meter supplier communicates with a certifying authority to obtain public key pairs and download the private keys to digital postage meters. This embodiment is believed to be advantageous since, assuming trust of the user by the certifying authority, the substantial expense and complexity of maintaining a communications infrastructure with large numbers of digital postage meters is avoided. Public data store 46 is also connected to link 24 to store data accessible to any party communicating over link 24.

Initially user station 20U stores identifying information ID$_{50}$ for digital postage meter 50 (e.g. a meter identification number), a description of a group [P] (i.e. information needed to carry out additive operation [+]) and a particular, publicly known point P in its working memory 34U, and stores user private KEY$_U$ in secure memory 35U. Certifying station 20CA stores [P], P, and information IAV$_{50}$ which identifies or characterizes meter 50 in its working memory 34CA; and private key Key$_{CA}$ in secure memory 35CA.; and public data store 46 stores public key Key$_{CA}$*P.

User station 20U initiates the certification process by generating and storing a random number r$_{50}$ in secure memory 35U, computing the point r$_{50}$*P, and sending point r$_{50}$*P to station 20CA together with its identifying information ID$_{50}$. The information is signed using the private key of station 20U to provide assurance to station 20CA as to the source of the information. Other methods for assuring the source of communications, such as secure channels or call back protocols can also be used to provide assurance of the source of the information. 3

In FIG. 8 station 20CA identifies the Identity and Attributes Value, IAV$_{50}$, for meter 50 and then generates and; stores a random number r$_{CA}$ in secure memory 35CA and computes the point:

$$OMC_{50}=r_{50}*P[+]r_{CA}*P=(r_{50}+r_{CA})*P$$

In the case where a certifying station cannot certify meter 50 the station can enter an error routine to abort the certification process. Details of such an error routine form no part of the subject invention.

Station 20CAF then generates message M:

$$M=OMC_{50}, IAV_{50}$$

and computes a hash H(M) of message M where H is a publicly known hashing function and is preferably the known SHA-1 function and then generates an integer I$_{50}$:

$$I_{50}=r_{CA}+H(M)Key_{CA}$$

and sends integer I$_{50}$ to station 20U, together with OMC$_{50}$ and IAV$_{50}$.

Station 20U then computes private key Key$_{50}$:

$$Key_{50}=r_{50}+I_{DM}=r_{50}+r_{CA}+H(M)Key_{CA};$$

and downloads Key$_{50}$, together with OMC$_{50}$ and IAV$_{50}$, to meter 50.

Meter 50 then uses Key$_{50}$ to sign indicia it generates, as will be described further below. A postal authority or other party seeking to verify meter 50's public key can compute Key$_{50}$*P as:

$$Key_{50}*P=OMC_{50}[+]H(M)Key_{CA}*P=(r_{50}+r_{CA})*P+H(M)Key_{CA}*P$$

from knowledge of H, M, said public key Key$_{CA}$*P, and OMC$_{50}$. Since the computation of public key Key$_{DM}$*P requires public key $Key_{CA}*P$ the verifying party has assurance that $Key_{50}*P$ has been certified by certifying authority CA.

While in the embodiment shown in FIGS. 7 and 8 only a single meter is described for reasons of clarity, those skilled in the art will recognize that this embodiment is particularly advantageous for the generation of blocks of public key pairs and corresponding certificates.

Further, while $Key_{50}$ is shown as being downloaded over data link 24 and encrypted with user's key $KEY_U$ for security, in other embodiments the user may physically load keys into meters prior to delivery to mailers. Also, suppliers may operate certifying stations in the manner described with respect to FIGS. 5 and 6 to provide new keys to meters, for example after remote or physical inspection of meters; and suppliers can obtain initial keys $Key_p$, described with respect to FIGS. 5 and 6, in the manner shown in FIGS. 7 and 8.

Figure 9:
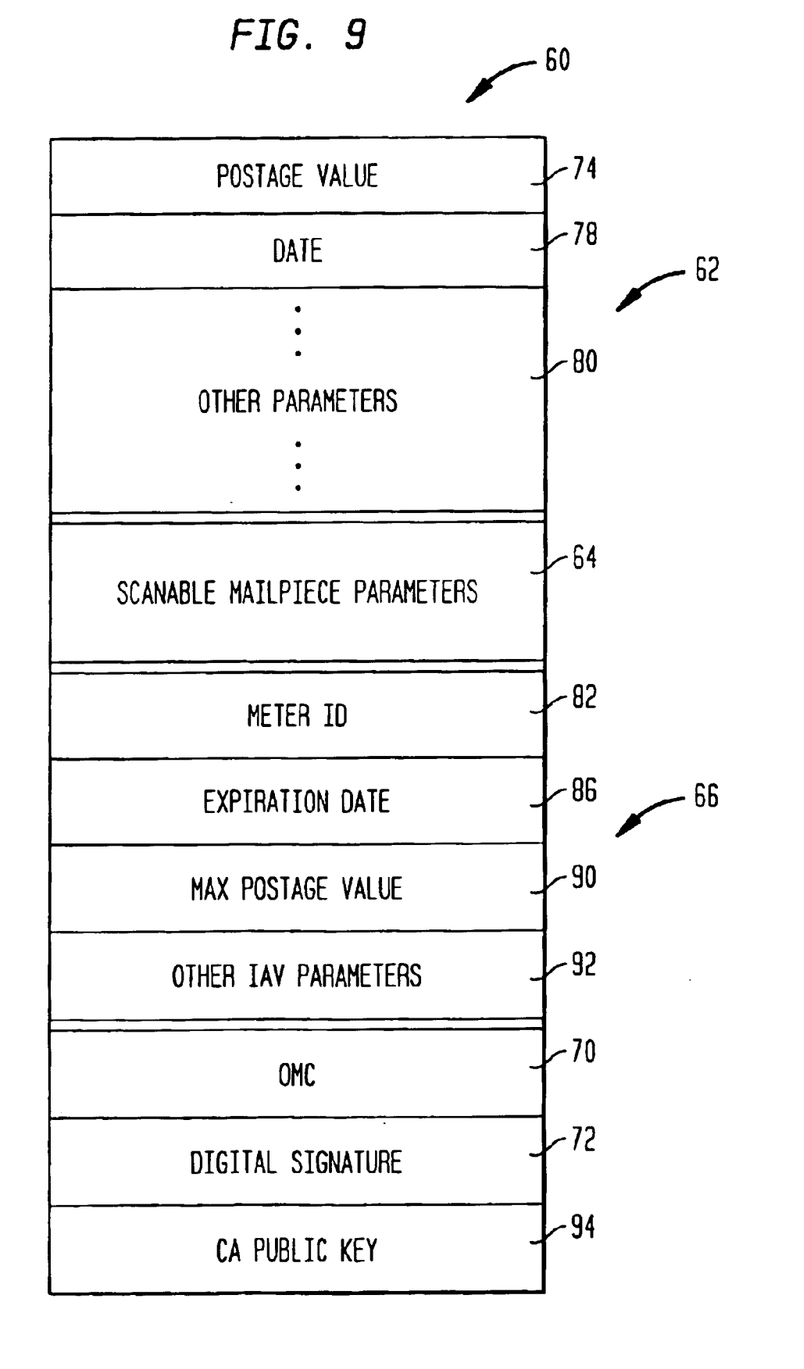
FIG. 9 is a schematic representation of a digital indicium in accordance with the subject invention.

Turning to FIG. 9, a postal indicia in accordance with the subject invention is shown.

(Though the following description is set forth with respect to meter 20DM those skilled in the art will understand that it applies equally to meter 50 and other meters in accordance with the subject invention, since the operations of generating and signing postal indicia and verifying public keys used to sign such indicia are substantially identical without regard to particular sequences of operations used to generate public key pairs and certificates.)

In FIG. 9 indicium 60 includes human readable parameters 62 (which can be OCR scanable), scanable mailpiece parameters 64, Identification and Attribute Value 66, Optimal Mail Certificate 70, and digital signature 72.

Human readable parameters include postage value 74, date 78 and other desired parameters 80 which are provided for the convenience of postal personnel and for the detection of mail underrating and the like. These parameters do not form part of the subject invention per se.

Scanable mail piece parameters are printed in a machine readable form such as the commercially available 2-dimensional barcodes "DataMatrix" and "Aztec" or the stacked barcode PDF417. Scanable mail piece parameters can include parameters such as meter accounting register values, meter sequential counter values, mail piece rating parameters such as weight or size, delivery control code, e.g. destination zipcode, and can also include values which are included in human readable parameters 62. These values can form part of the signed portion of indicium 60 if assurance as to their correctness is desired, or can be used only to facilitate handling of the mailpiece.

IAV 66 is also represented in machine readable form and, as described above, forms part of the signed portion of the indicia and includes meter identification 82, expiration date of the certificate 86, maximum postage value 90, and other parameters 92 such as a range of allowable postal codes, date of last meter inspection, or values of meter security sensors. Since the public key pair and corresponding OMC are functions of IAV it is preferred that IAV values remain constant for processing of a substantial number of mailpieces, preferably 10,000 or more; however if communications and processing rates are high enough IAV values can vary more rapidly.

OMC 70 also forms part of the signed portion of indicium 60.

Digital signature 72 (i.e. the CIVC) can be generated using known techniques and a more detailed description of signature mechanisms is not required for an understanding of the subject invention.

In particular embodiments CIVC values can be generated in one of two general ways: a digital signature with appendix, or a digital signature with message recovery. (See *Handbook of Applied Cryptography* A. Menezes, P. Van Oorshot, and S. Vanstone CRC Press 1997) Use of signatures with appendix is well known and involves generating a hash of the message to be signed, using a known hash function, and encrypting the hash. In public key systems the recipient also generates a hash of the message and compares it to the decrypted hash received with the message. Successful comparison validates the signature, i.e. signature of the message. Typical such algorithms are the RSA, DSA, and ECDSA algorithms and signing with appendix, (e.g. ECDSA) can be used with the subject invention.

In other preferred embodiments digital signature with message recovery can be used. Signatures with message recovery rely upon encryption of all or a portion of a message which is successfully recovered from the signature or CIVC and validated by internal redundancies; i.e. there is sufficient internal redundancy in the message that it is highly unlikely that a falsely signed message will not be internally inconsistent when recovered. These techniques for signing are particularly useful for signing of short messages and are preferred for signing of postal indicia which are necessarily short due to the size limitations discussed above and which include a high degree of redundancy.

To sign a postal indicium in accordance with these embodiments a postage meter or mailing system defines a message m including indicia data requiring protection such as postage value, date, ascending register value, piece count and perhaps other data need to provide increased redundancy. Preferably m is less than approximately 20 bytes. (The signing method of this embodiment will work with larger messages but is believed less effective.) A meter or mailing system processor, which is preferably a secure coprocessor or crytoprocessor, generates a random integer $r_S$, $r_S < n$ where n is the order of [P] and computes the integer $K = K(r_S*P)$ where $K(p)$ is any convenient mapping of a point in [P] onto the integers. The processor then generates e with a known symmetric key encryption algorithm using key K (hereinafter $SKE_K$) where:

$$e = SKE_K(m)$$

The processor then computes H(e, IAV) where H is again preferably the SHA1 hashing function and computes:

$$Key_{DM} H(e, IAV)$$

where $key_{DM}$ is the private key of the meter or mailing system.

The signature for message m is the pair (s,e).

A postal authority or other party wishing to verify an indicium derives the meter public key $Key_{DM}*P$ as described above and computes:

$$s*P[-]H(e,IAV)Key_{DM}H(e,IAV)*P = H(e,IAV)Key_{DM}*P[+]r_S*P[-]H(e,IAV)Key_{DM}*P = r_S*P$$

from values of e, IAV and $Key_{DM}$ recovered from the indicium and knowledge of H, and then recovers:

$$K = K(r_S*P)$$
$$m = SKE_K^{-1}(e)$$

where $SKE^{-1}_K$ is the inverse of $SKE_K$, and accepts m as valid if it is internally consistent. ([−] is "point subtraction, the inverse of [+] and its meaning will be apparent from inspection of FIG. 1.)

This method has particular advantages for postal indicia since plain text of m need not be incorporated into the indicia, saving scarce space in the indicia while protecting critical values.

It will be apparent to those skilled in the art that OMC and IAV need not be signed in this embodiment since they are necessary to derive $Key_{DM}*P$ and so are self-validating.

Public key $Key_{CA}*P$ can also be included in indicium 60 to facilitate verification with out the need to communicate with an external data base, space permitting. However key $Key_{CA}*P$ is also published, as for example by storage in public data store 46, to allow at least periodic independent verification.

Certificates generally are controlled by a validity period and authenticate that the certificate owner has certain rights. By incorporating limiting parameters such as expiration date or maximum postage value into the certificate as described above a simple check of the parameters enables the verification authority to detect mail pieces produced by a digital postage meter with an expired certificate or which otherwise exceeds parameter limits. This equivalent to revocation of the certificate but simpler and more automatic in execution and provide a finer control of the system.

In other embodiments of the subject invention certification can be carried out, substantially as described above, over other sets [E] for which an operation [op] exists such that I[op]E, where I is an integer, is an element of [E] and computation of I from knowledge of [E], E, and I[op]E is hard. For example the Digital Signature Algorithm is based on a subgroup of integers modulo a prime number p with binary operation being exponentiation. However, elliptic curves are preferred as computationally more efficient.

The embodiments described above and illustrated in the attached drawings have been given by way of example and illustration only. From the teachings of the present application those skilled in the art will readily recognize numerous other embodiments in accordance with the subject invention. In particular they will recognize that numerous other arrangements for the generation of public key pairs and corresponding certificates, depending upon the trust model assumed to apply among the parties, will be apparent to those skilled in the art from the above descriptions and are within the contemplation of the subject invention. Accordingly, limitations on the subject invention are to be found only in the claims set forth below.

What is claimed is:

1. A method for controlling, and distributing information between a digital postage meter and a certifying station operated by a certifying authority CA for publishing information, so that a public key $Key_{DM}*P$ of said digital postage meter can be determined by a party seeking to verify indicia printed by said digital postage meter from said published information with assurance that said public key $Key_{DM}*P$ has been certified by said certifying authority CA, said method comprising the steps of:

a) defining and publishing a finite group [P] with a binary operation [+] and publishing a particular point P in said group;

b) defining and publishing a binary operation K*p, where K is an integer and p is a point in said group, such that K*p is a point in said group computed by applying said operation [+] to K copies of said point p;

c) controlling a certifying station to publish a certificate $OMC_{DM}$ for said digital postage meter, wherein;

$OMC_{DM}=(r_{DM}+r_{CA})* P$; and wherein $r_{DM}$ is a random integer generated by said digital postage meter and $r_{CA}$ is a random integer generated by said certifying station;

d) controlling said certifying station to publish a message M;

e) controlling said certifying station to generate an integer $I_{DM}$, and send said integer to said digital postage meter, wherein;

$I_{DM}=r_{CA}+H(M)Key_{CA}$; and wherein

H(M) is an integer derived from said message M in accordance with a publicly known algorithm H and $Key_{CA}$ is a private key of said certifying authority CA;

f) publishing a public key $Key_{CA}*P$ for said certifying authority CA; and g) controlling said digital postage meter to compute a private key $Key_{DM}$, $Key_{DM}=r_{DM}+I_{DM}=r_{DM}+r_{CA}+H(M)Key_{CA}$; and h) controlling said digital postage meter to print an indicium and digitally sign said indicium with said key $Key_{DM}$; whereby i) said verifying party can compute said user's public key $Key_{DM}*P$ as $Key_{DM}*P=OMC_{DM}+H(M)Key_{CA}*P=(r_{DM}+r_{CA})*P+H(M)Key_{CA}*P$ from knowledge of H, M, [P], said public key $Key_{CA}*P$, and $OMC_{DM}$.

2. A method as described in claim 1 wherein said publicly known manner for deriving an integer from said published information comprises applying a hashing function to said message M.

3. A method as described in claim 2 wherein said message M includes information IAV identifying said digital postage meter and operating parameters applicable to said digital postage meter.

4. A method as described in claim 2 wherein said message M includes information IAV identifying said digital postage meter and operating parameters applicable to said digital postage meter.

5. A method as described in claim 1 wherein said group [P] is defined on an elliptic curve.

6. A method as described in claim 1 wherein said message M includes information tying said postage meter's public $KeyKey_{DM}*P$ to said information IAV.

7. A method for controlling a digital postage meter to print indicia signed with a private key $Key_{DM}$ based upon a published a finite group [P] with a binary operation [+] and a published particular point P in said group and a published a binary operation K*p, where K is an integer and p is a point in said group, such that K*p is a point in said group computed by applying said operation [+] to K copies of said point p, so that a public key $Key_{DM}*P$ of said digital postage meter can be determined by a party seeking to verify indicia printed by said digital postage meter from published information with assurance that said public key $Key_{DM}*P$ has been certified by a certifying authority CA, said method comprising the steps of:

a) controlling said digital postage meter to generate a random number $r_{DM}$ and send a point $r_{DM}*P$ to a certifying station;

b) controlling said digital postage meter to receive a certificate $OMC_{DM}$ from a certifying station operated by said certifying authority CA, wherein;

$OMC_{DM}=(r_{DM}+r_{CA})*P$; and wherein $r_{DM}$ is a random integer generated by said digital postage meter and $r_{CA}$ is a random integer generated by said certifying station;

c) controlling said digital postage meter to receive an integer $I_{DM}$ from said certifying station, wherein;

$I_{DM} = r_{CA} + H(M) Key_{CA}$; and wherein

M is a message published by said certifying station and H(M) is an integer derived from said message M in accordance with a publicly known algorithm H and $Key_{CA}$ is a private key of said certifying authority CA;

d) controlling said digital postage meter to compute a private key $Key_{DM}$, $Key_{DM} = r_{DM} + I_{DM} = r_{DM} + r_{CA} + H(M) Key_{CA}$; and e) controlling said digital postage meter to print an indicium and digitally sign said indicium with said key $Key_{DM}$; whereby f) said verifying party can compute said digital postage meter public key $Key_{DM}*P$ as $Key_{DM}*P = OMC_{DM} + H(M) Key_{CA} = (r_{DM} + r_{CA})*P + H(M) Key_{CA}*P$ from knowledge of H, M, [P], said public key $Key_{CA}*P$, and $OMC_{DM}$.

8. A method for controlling a certifying station operated by a certifying authority CA to publish information relating to a digital postage meter for printing indicia signed with a private key $Key_{DM}$ based upon a published a finite group [P] with a binary operation [+] and a published particular point P in said group and a published binary operation K*p, where K is an integer and p is a point in said group, such that K*p is a point in said group computed by applying said operation [+] to K copies of said point p, so that a public key $Key_{DM}*P$ of said digital postage meter can be determined by a party seeking to verify indicia printed by said digital postage meter from said published information with assurance that said public key $Key_{DM}*P$ has been certified by a certifying authority CA, said method comprising the steps of:

a) controlling said certifying station to receive a point $r_{DM}*P$ from a user station, where $r_{DM}$ is a random number generated by said user station;

b) controlling said certifying station to generate and send to said digital postage meter a certificate $OMC_{DM}$, wherein;

$OMC_{DM} = (r_{DM} + r_{CA})*P$; and wherein $r_{CA}$ is a random integer generated by said certifying station;

c) controlling said certifying station to generate and send to said user station an integer $I_{DM}$, wherein;

$I_{DM} = r_{CA} + H(M) Key_{CA}$; and wherein

M is a message published by said certifying station and H(M) is an integer derived from said message M in accordance with a publicly known algorithm H and $Key_{CA}$ is a private key of said certifying authority CA; whereby d) said digital postage meter can compute said private key $Key_{DM}$, $Key_{DM} = r_{DM} + I_{DM} = r_{DM} + r_{CA} + H(M) Key_{CA}$; and and digitally sign said indicium with said key $Key_{DM}$; and whereby e) said verifying party can compute said digital postage meter public key $Key_{DM}*P$ as $Key_{DM}*P = OMC_{DM} + H(M) Key_{CA}*P = (r_{DM} + r_{CA})*P + H(M) Key_{CA}*P$ from knowledge of H, M, [P], said public key $Key_{CA}*P$, and $CERT_{DM}$.

9. A method for controlling, and distributing information among a user station, a digital postage meter and a certifying station operated by a certifying authority CA for publishing information, so that a public key $Key_{50}*P$ of said digital postage meter can be determined by a party seeking to verify indicia printed by said digital postage meter from said published information with assurance that said public key $Key_{50}*P$ has been certified by said certifying authority CA, said method comprising the steps of:

a) defining and publishing a finite group [P] with a binary operation [+] and publishing a particular point P in said group;

b) defining and publishing a binary operation K*p, where K is an integer and p is a point in said group, such that K*p is a point in said group computed by applying said operation [+] to K copies of said point p;

c) controlling a certifying station to publish a certificate $OMC_{50}$ for said digital postage meter, wherein;

$OMC_{50} = (r_{50} + r_{CA})*P$; and wherein $r_{50}$ is a random integer generated by said digital postage meter and $r_{CA}$ is a random integer generated by said certifying station;

d) controlling said certifying station to publish a message M;

e) controlling said certifying station to generate an integer $I_{50}$, and send said integer to said user station, wherein;

$I_{50} = r_{CA} + H(M) Key_{CA}$; and wherein

H(M) is an integer derived from said message M in accordance with a publicly known algorithm H and $Key_{CA}$ is a private key of said certifying authority CA;

f) publishing a public key $Key_{CA}*P$ for said certifying authority CA; and g) controlling said user station to compute a private key $Key_{50}$, $Key_{50} = r_{50} + I_{50} = r_{50} + r_{CA} + H(M) Key_{CA}$; and h) transmitting said key $Key_{50}$ to said postage meter; whereby said digital postage meter can print an indicium and digitally sign said indicium with said key $Key_{50}$; and whereby i) said verifying party can compute said user's public key $Key_{50}*P$ as $Key_{50}*P = OMC_{50} + H(M) Key_{CA}*P = (r_{50} + r_{CA})*P + H(M) Key_{CA}*P$ from knowledge of H, M, [P], said public key $Key_{CA}*P$, and $OMC_{50}$.

10. A method as described in claim 9 wherein said publicly known manner for deriving an integer from said published information comprises applying a hashing function to said message M.

11. A method as described in claim 10 wherein said message M includes information IAV identifying said digital postage meter and operating parameters applicable to said digital postage meter.

12. A method as described in claim 9 wherein said message M includes information IAV identifying said digital postage meter and operating parameters applicable to said digital postage meter.

13. A method as described in claim 9 wherein said group [P] is defined on an elliptic curve.

14. A method as described in claim 9 wherein said message M includes information tying said postage meter's public key $Key_{50}*P$ to said information IAV.

15. A method for controlling a certifying station operated by a certifying authority CA to publish information relating to a digital postage meter for printing indicia signed with a private key $Key_{DM}$ based upon a published a finite group [P] with a binary operation [+] and a published particular point P in said group and a published a binary operation K*P, where K is an integer and p is a point in said group, such that K*p is a point in said group computed by applying said operation [+] to K copies of said point p, so that a public key $Key_{DM}*P$ of said digital postage meter can be determined by a party seeking to verify indicia printed by said digital postage meter from said published information with assurance that said public key $Key_{DM}*P$ has been certified by a certifying authority CA, said method comprising the steps of:

a) controlling said certifying station to receive a point $r_{DM}*P$ from a user station, where $r_{DM}$ is a random number generated by said user station;

b) controlling said certifying station to generate and send to said user station a certificate $OMC_{50}$, wherein;

$$OMC_{50}=(r_{50}+r_{CA})*P; \text{ and wherein}$$

$r_{CA}$ is a random integer generated by said certifying station;

c) controlling said certifying station to generate and send to said user station an integer $I_{50}$, wherein;

$$I_{50}=r_{CA}+H(M)Key_{CA}; \text{ and wherein}$$

M is a message published by said certifying station and H(M) is an integer derived from said message M in accordance with a publicly known algorithm H and $Key_{CA}$ is a private key of said certifying authority CA; whereby d) said user station can compute said private key $Key_{DM}$, $$Key_{50}=r_{50}+I_{50}=r_{50}+r_{CA}+H(M)Key_{CA}; \text{ and}$$

and transmit said key $Key_{50}$ to said digital postage meter; whereby e) said digital postage meter can digitally sign said indicium with said key $Key_{50}$; and whereby f) said verifying party can compute said digital postage meter public key $Key_{50}*P$ as $$Key_{50}*P=OMC_{50}+H(M)Key_{CA}*P=(r_{DM}+r_{CA})*P+H(M)Key_{CA}*P$$

from knowledge of H, M, [P], said public key $Key_{CA}*P$, and $CERT_{DM}$.

16. A method for determining a public key $Key_{DM}*P$ of a digital postage meter with assurance that said key $Key_{DM}$ has been certified by a group of one or more certifying authorities CA, said method comprising the steps of:

a) scanning an indicium produced by said postage meter to obtain a certificate $OMC_{DM}$ for said postage meter, wherein;

$$OMC_{DM}=(r_{DM}+sum(r_{CAi}))*P; \text{ and wherein}$$

$r_{DM}$ is a random integer known only to a party generating said key $Key_{DM}$ and $sum(r_{CAi})$ is a sum of a plurality of random integers $r_{CAi}$, an ith one of said certifying stations generating an ith one of said random integers $r_{CAi}$;

b) scanning said indicium produced by said postage meter to obtain a message M said message M being published by a certifying station operated by one of said certifying authorities CA;

c) computing a hash H(M) of said message M in accordance with a predetermined hashing function H;

d) obtaining at least one public $key_{CAi}*P$ corresponding to said one or more certifying authorities CA, an ith one of said authorities having an ith one of said keys $Key_{CAi}$; and e) computing said user's public key $Key_U*P$ as $$Key_U*P=CERT_U[+]H(M)sum_{[+]}(Key_{CAi}*P)=(r_U+sum(r_{CAi}))*P[+]sum(H(M)Key_{CAi})*P; \text{ wherein}$$

f) a binary operation [+] is defined on a finite group [P] having a published particular point P; and g) K*p, is a second binary operation defined on said group [P], where K is an integer and p is a point in said group, such that K*p, is a point in said group computed by applying said operation [+] to K copies of said point p.

17. A method of digitally signing a postal indicium comprising the steps of:

a) generating a message m, said message m including indicia data;

b) generating a digital signature with message recovery for said message m; and c) incorporating said digital signature into said indicium; wherein d) said generating step further comprises the substeps of:

d1) generating a random integer $r_S$, $r_S<n$, where n is the order of a group [P] defined on an elliptic curve;

d2) generating a integer K, $$K=K(r_S*P)$$

where K(p) is a mapping of points in [P] onto the integers, and P is a particular published point in [P];

d3) generating e, $$e=SKE_K(m)$$

where $SKE_K$ is a symmetric key encryption algorithm using key K;

d4) generating H(M), where H is a hashing function and M is a message which can be recovered from said indicium;

d5) generating $s=Key_{DM}H(M)+r_S$, where $Key_{DM}$ is the private key of a postage meter which produced said indicium; and d6) setting said digital signature for said message m equal to the pair (s,e).

18. A method as described in claim 17 wherein M=(e, IAV), where IAV is an identity and attributes value for said postage meter.

19. A method of verifying a digital signature of a postal indicium comprising the steps of:

a) recovering a message m from a digital signature of a postal indicium; and b) accepting said signature as valid if said message m is internally consistent; wherein c) said recovering step further comprises the substeps of:

c1) recovering a public key $Key_{DM}*P$ for a postage meter which produced said indicium;

c2) obtaining the signature (s,e) of said indicium, where $s=Key_{DM}H(M)+r_S$ and $e=SKE_K(m)$, where $SKE_K$ is a symetric key encryption algorithm using key K, m is indicia data, and M is a message recoverable from said indicium;

c3) obtaining M from said indicium;
c4) generating $$s*P[-]H(M)\text{Key}_{DM}*P = H(M)\text{Key}_{DM}*P[+]r_S*P[-]H(M)\text{Key}_{DM}*P = r_S*P$$

where [−] is the inverse of [+];
c5) generating $$K = K(r_S*P)$$

where K(p) is a mapping of points in [P] onto the integers, and P is a particular published point in [P];

c6) generating $$m = SKE^{-1}{}_K(e)$$

where $SKE^{-1}{}_K$ is the inverse of $SKE_K$.

20. A method as described in claim 19 wherein M=(e, IAV), where IAV is an identity and attributes value for said postage meter.

* * * * *